Oct. 31, 1950  V. L. PARSEGIAN ET AL  2,528,015
MEANS FOR RECORDING ON A STRIP CHART
Filed June 18, 1946  3 Sheets-Sheet 1
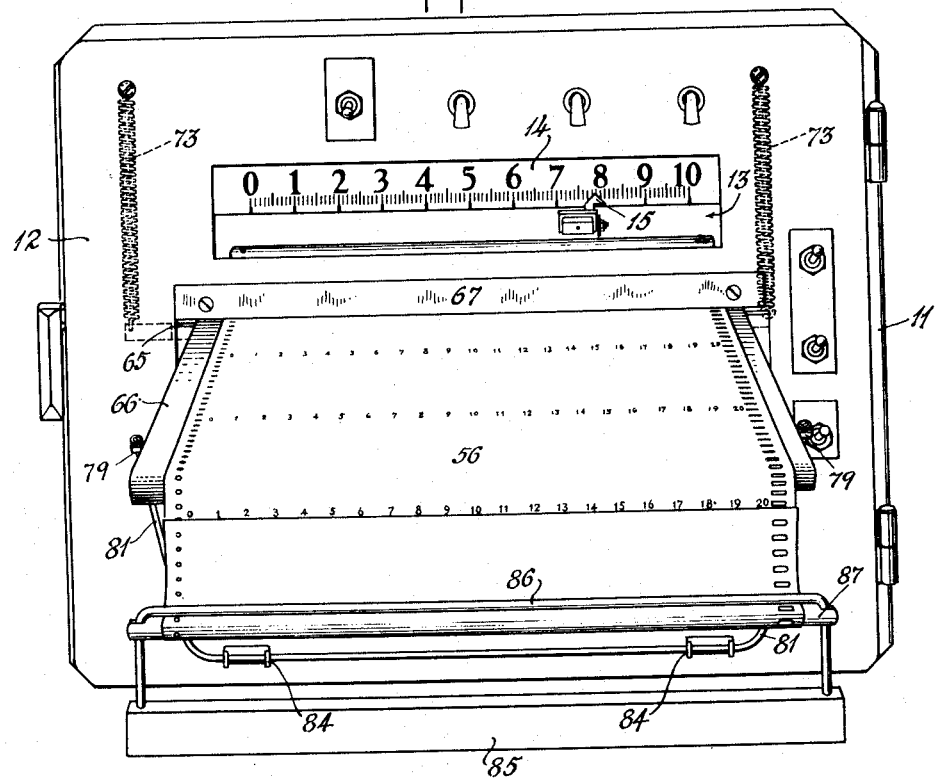
WITNESS
G. V. Rasmussen
INVENTORS
VOZCAN L. PARSEGIAN
CHARLES O. FAIRCHILD
BY NELSON L. WALKER
Klein, Alexander & Pohl
ATTORNEYS

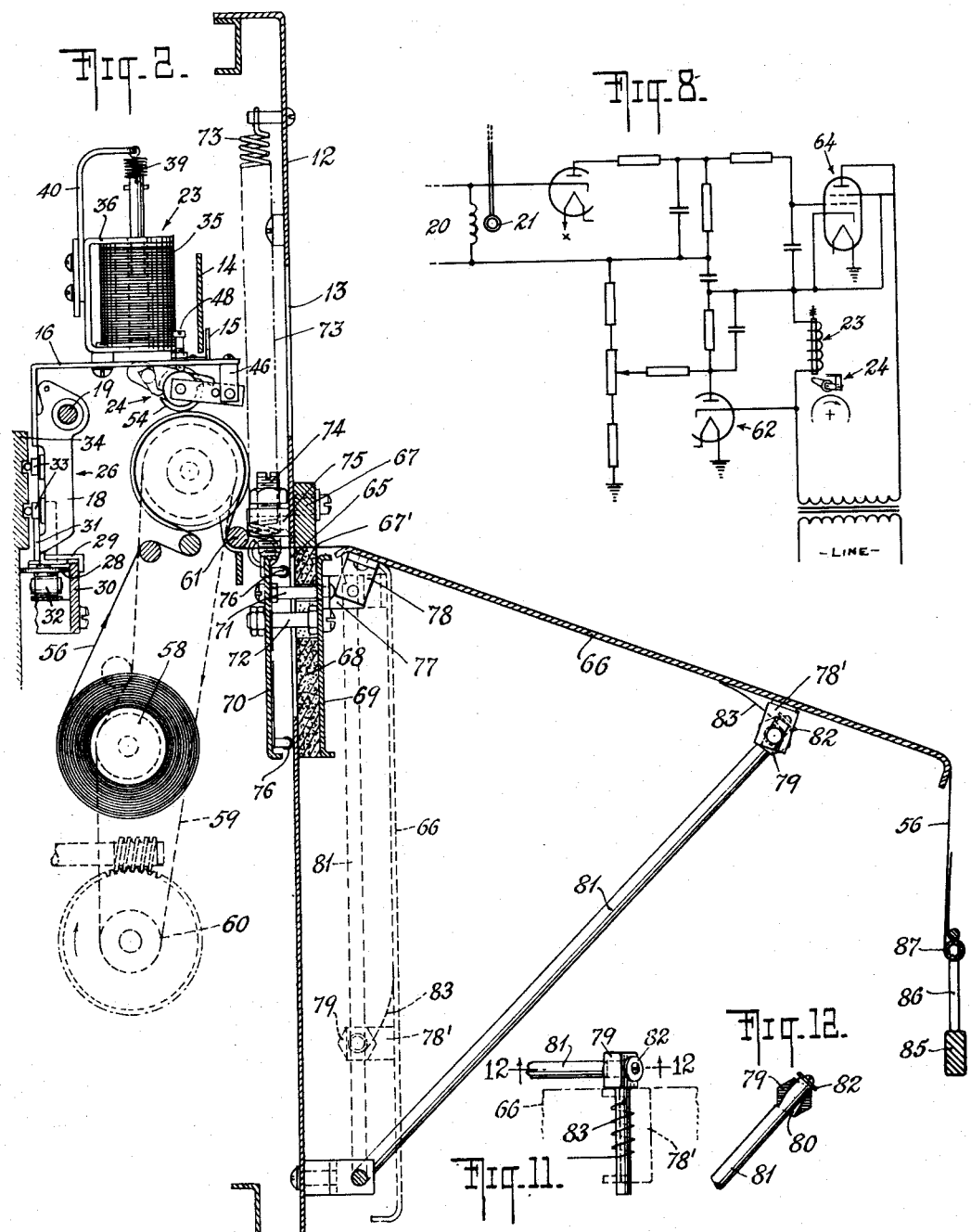

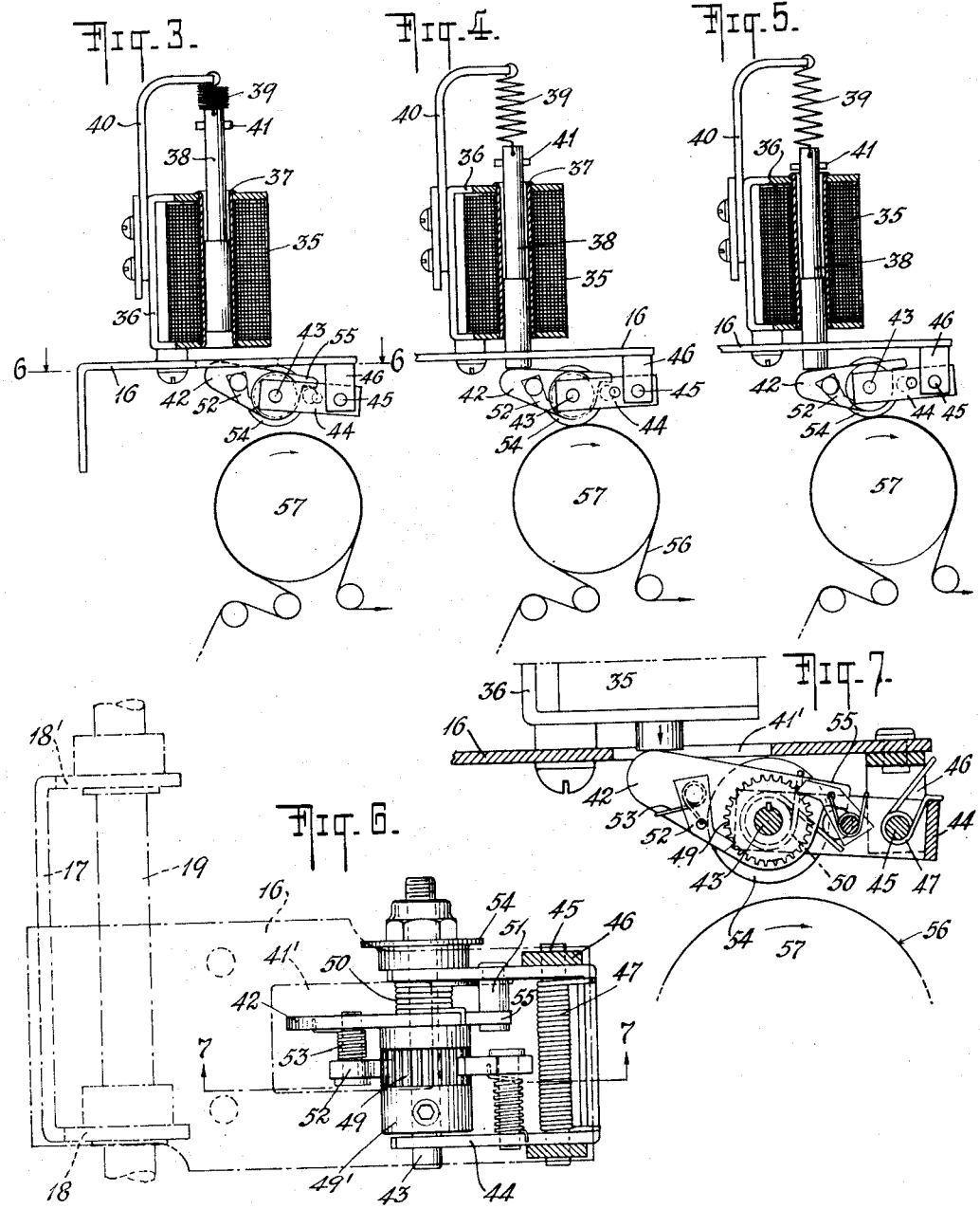

Patented Oct. 31, 1950

2,528,015

UNITED STATES PATENT OFFICE 2,528,015

MEANS FOR RECORDING ON A STRIP CHART

Vozcan L. Parsegian, Charles O. Fairchild, and Nelson L. Walker, New York, N. Y., assignors, by mesne assignments, to Weston Electrical Instrument Corporation, Newark, N. J., a corporation of New Jersey Application June 18, 1946, Serial No. 677,458

10 Claims. (Cl. 346—139)

The present invention relates to improvements in apparatus for recording a condition such as current, temperature, voltage, etc. and more particularly to improved recording apparatus which may be used with a self-balancing measuring or controlling system, such as, the system disclosed in pending application Serial No. 630,898 filed November 26, 1945, for Recording and Controlling Systems, to make a record of the changes in the condition being measured or controlled by such a system.

One of the objects of the invention is to provide a recording device which is capable of performing its functions at an extremely high rate of speed.

Another object of the invention is to provide an improved printing mechanism which can utilize the high velocity imparted to a solenoid plunger by an extremely short pulse of heavy current to accomplish a recording in less than one-tenth of a second.

A further object of the invention is to provide recording apparatus having relatively few parts of sturdy construction and which can be reliably operated at extremely high speeds.

A further object of the invention is to provide a recording device which is in part readily accessible to the operator from the exterior of its casing and yet which will be sealed against infiltration of dust and dirt.

A still further object of the invention is to provide a recording device having improved means for recording additional informative matter on the chart and which may be utilized by the operator to attain access to the portion of the chart interiorly of the casing.

Other objects of the invention as well as the novel features of construction thereof will become apparent after a perusal of the following description, when read in connection with the accompanying drawings, in which, Fig. 1 is a front elevational view of a recorder embodying the invention; Fig. 2 is a central vertical section, on an enlarged scale, of the door of the casing and associated recording instrumentalities; Fig. 3 is an enlarged side elevational view of the printing mechanism illustrated in Fig. 2 and showing the positions of the parts thereof in their at-rest condition; Fig. 4 is a view similar to Fig. 3 showing the positions of such parts in an intermediate stage of the printing operation; Fig. 5 is a view similar to Figs. 3 and 4 showing the positions of the parts during the final step of the printing operation; Fig. 6 is a section taken along the line 6—6 of Fig. 3, and showing the parts in plan view and on an enlarged scale; Fig. 7 is a sectional view taken along the line 7—7 of Fig. 6; Fig. 8 is a diagrammatic view of the printing circuit; Fig. 9 is a view similar to Fig. 7 showing a modified form of the invention; Fig. 10 is a view similar to Fig. 6 showing a top plan view of the stylus mechanism illustrated in Fig. 9; Fig. 11 is an enlarged detail in plan view of the latching mechanism for the shelf and Fig. 12 is a sectional view taken along the line 12—12 of Fig. 11.

In the drawings, the reference numeral 11 indicates the casing of the recorder which may be secured to a supporting wall or instrument panel in any suitable fashion. The casing 11 is provided with a hinged door 12 having an elongated aperture 13 through which may be observed a scale 14 that is traversed by a pointer 15. As is shown more clearly in Fig. 2 of the drawings, the pointer 15 is mounted on the forward free end of a horizontal plate 16 which is provided at its rear with a vertical section that is secured to a transverse portion 17 of a carriage 26 (note Fig. 6). The carriage 26 comprises two spaced side members 18, 18' which at their upper ends are integral with the transverse connecting portion 17 and which are slidably mounted on a track 19 that extends across the width of the casing and is supported at its ends by the main frame. The carriage 26 is slidably moved along the track 19 in the manner shown in Fig. 1 of said aforesaid application Serial No. 630,898 wherein a belt 27 which is connected at its ends to the two side members 18, 18' is driven by a pulley connected to the shaft of a reversible motor 21. The carriage 26 is maintained in proper position during its sliding movements by a revolvable disc or wheel 28 and a guide plate 29 which are mounted on the lower end of carriage 26 intermediate its side members 18, 18' and which engage with the rear and front surfaces, respectively, of a flat guide track 30 mounted on the main frame of the instrument (see Fig. 2 of the drawings). The carriage 26, also supports a bracket 31 mounted on side member 18' and carrying at its lower end a roller 32 which rides on a flat track to operate a switch (not shown) mounted on the flat guide track 30. The location of this switch may or may not be adjustable. In the sliding movements of the carriage, a pair of contacts 33, 33 provided thereon and comprising the sliding contact 22 of the slide wire potentiometer circuit illustrated in Fig. 1 of the said co-pending application, engage with the slide wire and return bar of such circuit which in Fig. 2 herein are shown mounted in separate channels provided on the front face of the slide wire frame 34. Mounted on the plate 16 in back of the pointer 15 and scale 14 is a solenoid 23 whose coil 35 has one terminal connected to a thyratron 64 and another terminal connected to the plate of the half 62 of a double diode tube and to the line (note Fig. 8). As is shown more clearly in Figs. 2 to 7 of the drawings, the solenoid coil 35 is secured in upright position between two arms of a U-shaped bracket 36, the lower arm of which is mounted in spaced relation upon the plate 16. The two arms of bracket 36 have apertures which are aligned with the central passageway of the coil. A tubular member or sleeve 37 extends through such apertures and such central passageway and is secured in position by crimping its ends over the outer surfaces of the two arms of bracket 36. Positioned within the sleeve 37 is a plunger 38, consisting of an upper section of high permeability material such as soft iron, and a lower section of non-magnetic material such as 18-8 stainless steel. The plunger 38 is supported at its upper end by a spring 39 attached to and depending from the arm of a bracket 40 secured to the central portion of the U-shaped bracket 36. The plunger 38 is limited in its downward movement by a pin 41 which extends through the upper end thereof and whose ends engage the upper end of the sleeve 37 to accomplish such purpose (note Fig. 5). The lower end of the plunger 38 is enlarged so that its up and down movements are maintained as much as possible in the direction of its longitudinal axis without affecting its freedom of movement through the sleeve 37.

The plate 16 beneath the sleeve 37 is provided with an aperture 41' through which the plunger 38 passes in its downward movement when the coil 35 is energized. Disposed in the path of movement of the plunger 38 is the free end of a printing lever 42 which is rotatably mounted on a shaft 43 carried by the arms of a U-shaped yoke 44, the latter of which is in turn pivotally mounted on a shaft 45 supported by the two arms of a U-shaped bracket 46 secured by its central portion to the under side of the forward end of the plate 16. The yoke 44 is normally maintained in raised position (see Fig. 3) by means of a coiled spring 47 which, as is shown more clearly in Figs. 6 and 7 of the drawings, is positioned on shaft 45 intermediate the arms of yoke 44 and has one end bearing against the central portion of yoke 44, and its other end bearing against the central portion of the U-shaped bracket 46, the said other end cooperating with bracket 46 to serve as a stop to limit the range of downward movement of the yoke 44 by standing in the path of movement of the central portion of such yoke. The uppermost position of the yoke 44 may be adjusted by the manipulation of an adjustable screw 48 which extends in threaded engagement through plate 16 (see Fig. 2) and whose lower end normally engages with the exterior surface of the hub 49' of a ratchet wheel 49 affixed to shaft 43. The lever 42 carried by yoke 44 is normally maintained in raised position by a coiled spring 50 which is positioned on shaft 43 intermediate such lever and the adjacent arm of yoke 44 and which has one end bearing against the upper side of such lever and has its other end bearing against an inwardly projecting stud 51 provided on such adjacent arm of the yoke 44. The spring 50 is stronger than the spring 47 so that a downward force exerted on the free end of lever 42 will tend to rotate both the lever 42 and the yoke 44 about shaft 45, as a unit, until yoke 44 has reached the end of its downward movement under such force, whereupon lever 42 will then be rotated by the force. Mounted upon the free end of the lever 42 is a pawl 52 whose free end engages the teeth of the ratchet wheel 49, the pawl 52 being maintained in contact with the ratchet wheel 49 by means of a coiled spring 53 (see Fig. 6) positioned intermediate such pawl and lever 42 on the pawl supporting stud shaft and having its ends bearing against the pawl and lever. Affixed to shaft 43 is a stylus disc 54, the disc being shown positioned on the end of the shaft which projects beyond the arm of yoke 44 provided with the stud 51. The stud 51 also serves as a stop to limit upward movement of the lever 42 under the influence of spring 50 through its coaction with a tail piece 55 formed on such lever (note Figs. 3 and 7).

It will be understood from the foregoing, that in the normal unenergized condition of the solenoid 23, the solenoid plunger 38 will be at-rest in its uppermost position and the lever 42 and yoke 44 will be at-rest in their uppermost positions, this condition of the parts being illustrated in Fig. 3 of the drawings. When a short impulse of heavy current is sent through the coil 35 of the solenoid, the plunger 38 will be driven downwardly until it hits the printing lever 42 (note Fig. 7). Due to the fact that spring 50 of lever 42 is stronger than spring 47 of the yoke 44, the result of the initial impact of plunger 38 on lever 42 will be to cause the lever and yoke 44 together with the parts carried by such yoke to be moved downwardly as a unit about shaft 45 until the stylus disc 54 comes into contact with the portion of the chart 56 on roller 57. This stage of the operation is illustrated in Fig. 4 of the drawings. When the stylus disc 54 makes contact with the chart, the downward movement of the yoke 44 will be arrested. The momentum of plunger 38 however is still great enough to cause the lever 42 to be rotated about shaft 43, thereby causing the drive pawl 52 to drive the ratchet 49 which is fixed to shaft 43. The rotational movement thus imparted to shaft 43 will cause the stylus disc 54 secured thereto and clamped against the chart, to be rotated, thus leaving a mark on the surface of the chart. The stylus disc 54 is made of a material which will readily leave a mark on the chart when it is rubbed thereagainst, such as, for example, an alloy of silver or lead. At the end of its stroke the plunger 38 will be returned to its at-rest position by the spring 39 and the lever 42 and yoke 44 will be returned to their at-rest positions by their associated springs 50 and 47 respectively. During this operation and continuously during the use of the device, the chart 56 is fed over the roller 57 in the direction of the arrows shown in Figs. 3 to 5 at any desired rate, say one-half inch per minute. The chart may be fed from a supply roll 58 to the roller 57, both of which rolls may be connected to and driven by an endless chain 59 to which movement may be imparted by a sprocket 60 driven by a motor (not shown) through worm mechanism, in the manner illustrated in Fig. 2 of the drawings. The chart 56 in its feed from the roller 57 passes underneath the roller 61 and out through an aperture 65 in the door 12 and onto a shelf 66 mounted on such door.

As will be noted from Figs. 1 and 2 of the drawings, the chart discharge aperture 65 in the door of the casing has a length greater than the width of the shelf 66 and has mounted on its upper side a bar 67 which defines the upper edge of the slot through which the chart passes. The lower edge of the bar 67 is substantially in line with a straight line drawn from beneath the roller 61 to the rear edge of the shelf or writing table 66 and has a square or sharp edge 67' by which the paper of the discharged portion of the chart can be cut neatly by pulling it upward against this edge. The lower edge of the discharge slot is formed by the upper end of a pad 68 of felted material which just engages the underside of the chart so as to close the slot against the entry therethrough into the casing of dust or dirt while permitting the feed of the chart onto the shelf 66. The felt pad 68 is substantially as long as the bar 67 and extends over the entire lower portion of the aperture 65, being positioned intermediate the exterior of the door 12 and an elongated vertically disposed plate 69. The pad 68 and plate 69 are carried by an interior plate 70, being connected to the latter and maintained in substantial parallel relation therewith by spacer members 71 and tie rods 72, which extend through aperture 65 and the pad 68 (note Fig. 2). The plate 70 and consequently plate 69 and pad 68 is supported by a pair of vertically disposed springs, 73, 73 which are connected at their upper ends to stud bolts provided on the upper end of the door and which normally maintain the top flanged edge of plate 70 against the lower ends of a pair of adjustable screws 74. The screws 74 are in threaded engagement with and extend vertically through a pair of projecting portions 75 provided on the interior surface of the door adjacent the upper edge of the aperture 65 and may be manipulated to adjust the pressure of the pad 68 on the chart 56. Each end of the plate 70 which extends beyond the adjacent end of the aperture 65 is provided with a pair of forwardly projecting members having mounted on their outer ends rollers 76, 76 which engage the interior surface of the door and permit upward and downward movement of such plate and pad 68 and plate 69 relative to the door while maintaining such parts in substantial parallelism with the material of the door.

The outer plate 69 is provided with a pair of spaced brackets 77 to each of which is pivotally connected a bracket 78 that is secured to the under surface of the rear end of the shelf 66 so that the rear of such shelf is pivotally mounted on the plate 69. Also secured to the underside surfaces of shelf 66 at places adjacent to but spaced from the forward end of such shelf are a pair of U-shaped brackets 78'. The depending arms of each of such brackets 78' are provided with aligned apertures in which is rotatably mounted the shank of a bolt whose head 79 projects beyond the side edge of the writing table or shelf 66 (note Figs. 1 and 11 of the drawings). The heads 79, 79 of such bolts are provided with transverse passageways 80 to receive the supporting rods 81, 81 which extend therethrough, the diameters of such passageways 81 being slightly greater than the diameter of the body portions of the rods 81 so that the bolt heads 79, 79 may readily slide upon such rods. The outer or free ends of the rods 81, 81 are reduced in cross-section so that there is a shoulder formed on each rod intermediate such end portion and the body thereof (see Fig. 12). Connected to the outer end portion of each rod 81 is a stop disc or washer 82 to limit the outward movement of shelf 66 relative to the rods. Mounted on the shank of each bolt, intermediate the arms of its supporting bracket 78' is a torsion spring 83 having one end secured to the bolt and its other end engaging with the under surface of the shelf so that the heads 79, 79 of such bolts normally tend to rotate in a counter-clockwise direction, as viewed in Fig. 2 of the drawings. The supporting rods 81, 81 are integral with a central portion which is rotatably supported by a pair of brackets 84, 84 secured to the bottom end portion of the door (note Fig. 1). When the shelf is not in use the rods 81, 81 are pivoted on the brackets 84, 84 so that they are in substantial parallelism with the door (note Fig. 2). In this position of the rods, the shelf 66 is folded downwardly into the position shown in dotted outline in Fig. 2 of the drawings. When the shelf 66 is to be positioned for use, it is lifted by grasping the lower or outer edge thereof and swinging it outwardly and upwardly about its upper pivots. The heads 79, 79 of the bolts during such upward movement will slide outwardly on the suppotring rods 81, 81 and cause the latter to pivot outwardly. When the heads 79, 79 of the bolts pass onto the reduced end portions of the rods 81, 81 they are rotated slightly in a counter-clockwise direction under the tension of their associated springs 83, 83 so that the faces of the bolt heads defining the inner ends of the transverse passageways 80, 80 therein can come into abutting relation with the shoulders formed at the inner ends of the reduced end portions of the rods when the shelf is released, thus effectively locking the shelf in operative position until the bolt heads 79, 79 are positively rotated in a clockwise direction against the tension of their associated springs 83, 83 to bring the passageways 80, 80 into alignment to receive the body portions of the rods 81, 81. It will thus be evident that when the shelf is to be restored to its inoperative position, the heads 79, 79 of the bolts are turned by the operator in a clockwise direction so that the locking engagement of the bolt heads with the shoulders on the rods is broken and the passageways 80, 80 thereof are turned to slidably receive the body portions of the rods 81, 81. The table 66 can then be let fall about its upper pivots until it is restored to its inoperative position. In the operative position of the shelf 66, the discharged portion of chart 56 is maintained tautly on the upper surface thereof by a weight member which includes a weighted bar 85 carried by the arms of a U-shaped supporting portion or member 86. Slidably mounted upon the arms of such member 86 is a light hollow tube 87 which coacts to support the weight on the end of the chart. As will be seen from Figs. 1 and 2 of the drawings, the paper of the chart is drawn around the lower end of the tube 87 and then passes intermediate such tube and the central section of the U-shaped member 86 between which it is effectively clamped. This construction not only enables the weight to be readily and securely attached to the end of the chart, but it enables the weight to be readily shifted thereon during the feed of the chart by merely pulling up on the portion of the chart that is beyond the tube 87 and member 86.

From the foregoing, it is believed that it will be understood that in the use of the recorder mechanism hereinabove described, it will be utilized in combination with some means for detecting variations in the condition being measured or controlled and for translating such changes into variations capable of controlling the printing circuit, such as, for example, the means included in the system disclosed in the aforesaid co-pending application Serial No. 630,898. For the purposes of an understanding of the invention, it is believed sufficient to point out that in the system disclosed in said co-pending application, the input voltage to be measured, created by a change in temperature of a thermocouple, is balanced against the E. M. F. of a slide wire in a potentiometer circuit of which the contacts 33, 33 shown in Fig. 2 of the drawings, form the sliding contact. When the input voltage is increased or decreased from a normal condition of the potentiometer circuit, the motor 21 (see Fig. 8) will be caused to rotate in one direction or the other to move the carriage 26 and consequently the contacts 33, 33 carried thereby, in a direction to restore balance. When this has been accomplished, the printing circuit (Fig. 8) comes into operation to cause the solenoid 23 to actuate the printing mechanism 24.

During the movements of carriage 26, the index 15 mounted on plate 16 traverses the scale 14 to provide a measure of the position of the contact 33 with respect to the potentiometer slide wire. and therefore of the E. M. F. and thus of the temperature of the thermocouple when the balanced condition in the potentiometer circuit has again been restored. During such movements of the carriage also, the solenoid 23 and the printing mechanism will be carried to a position over the chart 56 where the printing stylus when actuated will place a mark indicating the value of the condition being recorded. The printing circuit is so designed that the solenoid 23 is operated at periods of one second or with any other suitable periodicity, so long as a balance is maintained in the potentiometer circuit. As is explained more fully in the aforesaid application Serial No. 630,898 and as shown in Fig. 8 of the drawings of this invention, the printing circuit is so designed that when an exact balance is attained in the potentiometer and amplifier circuits and the motor has ceased to rotate, the negative bias on the control grid of the thyratron 64 will drop to such a degree as to cause such tube to fire. The thyratron on firing, passes a heavy current through the coil 35 of the solenoid 23, thus causing the plunger 38 to move downwardly against the printing lever 42 and cause the stylus disc 54 to make a mark on the chart, as has been explained. The pulse duration of the current passed by the thyratron is of the order of one-thirtieth of a second, while the printing stroke is accomplished in less than one-thirtieth of a second. Thus a complete recording operation is accomplished in approximately 0.05 second. The time of contact of the stylus with the chart is of the order of one-thousandth of a second and during that period the solenoid coil 35 is no longer energized so that the bounce of the plunger 38 as it reaches the end of its stroke and the action of spring 39 will almost immediately return the plunger to its at-rest position. The rapid deenergization is accomplished by utilizing the high voltage developed across the solenoid when the thyratron is fired, to quickly quench the thyratron. This voltage is also utilized to limit repeated firing of the thyratron to predetermined one second intervals.

As has been explained, the chart is continuously fed out through the slot in the door formed by the bar 67 and the felt pad 68 and to the writing table or shelf 66 where it is readily available for observation or for the placing of additional informative matter thereon by the operator. The tension of the springs 73, 73 is such that during such use of the shelf, it will be maintained in proper relation relative to the bar 67. When however, the operator desires entry into the casing through such slot, such as to make easy the initial feeding-in of the chart paper, he presses down with his hand on the rear of the shelf 66, thus causing the unit composed of plates 69 and 70 and the felt pad 68 to move downwardly against the tension of springs 73, 73 and consequently opening the slot sufficiently so that he may gain entry through the opening 65 of the door into the interior of the casing. When the pressure of the operator's hand is released, the said parts automatically return to their normal positions, under the influence of the springs 73, 73 to again close the slot and thus seal the opening through which the chart passes.

It will thus be seen that a novel recording mechanism of extremely high velocity is provided and which is readily available to the operator through a single manipulation of the shelf with which are associated elements which effectively seal the recording mechanism against dust in the normal operation of the device. It is believed that it will be apparent also that the above described mechanism may be modified and changed without departing from the spirit of the invention. For example, the portion of the recording mechanism shown in Figs. 6 and 7 may be modified to print by a contact action on the chart 56 instead of the rubbing action of stylus 54. Such a modification of this mechanism is illustrated in Figs. 9 and 10 of the drawings, wherein the parts are similar to and operate in the same manner as the parts shown in Figs. 6 and 7, except in the following particulars. The spring 50' is weaker than the spring 47' so that the impact of plunger 38 on the lever 42', instead of initially rotating such lever and the yoke 44, as a unit, as is the case with the mechanism of Figs. 6 and 7, will cause the lever 42' to initially turn about the shaft 43 until a projecting portion 89 on such lever comes into engagement with the stud 51 on the yoke 44. When this occurs the lever 42' will be fixed relative to the yoke 44 and under the continued downward movement of plunger 38, the lever and yoke will be pivoted as a unit about shaft 45 until the stylus hits the record sheet 56 with a sharp blow. As the stylus disc 54 has been rotated during the initial pivoted movement of lever 42', it will be stationary relative to the parts of the unit at the moment of impact. The stylus 54 in this embodiment is in engagement with an inking pad 90 which is secured to the outer end of a shaft member 91 rotatably mounted on an arm of the yoke 44. The other end of shaft member 91 has secured thereto a gear wheel 92 which meshes with a gear wheel 93 secured to shaft 43. Thus when lever 42' is initially rotated under the impact of plunger 38, shaft 43, through pawl 52 and ratchet wheel 49, is caused to rotate, thus rotating stylus 54 and through gears 92, 93, the inking pad 90 to bring freshly inked rim portions of the stylus into position for the printing operations.

What is claimed is:

1. Recording apparatus comprising a solenoid coil, a plunger in said coil, spring means normally maintaining said plunger in retracted position, a rotatable shaft, a movable support for said shaft, a marking member secured to said shaft, a lever movably mounted on said shaft, means for yieldably maintaining one end of said lever in the path of movement of said plunger, a pawl mounted on such free end of said lever and a ratchet secured to said shaft and engaged by said pawl, whereby when the solenoid coil is energized to advance said plunger into engagement with the free end of said lever, said ratchet, shaft and marking member are rotated through said pawl.

2. Recording apparatus such as defined in claim 1, in which said movable support is mounted for pivotal movement about an axis spaced from but parallel to the axis of rotation of said shaft, spring means normally maintaining the shaft bearing portion of said support in an advanced position, said spring means being weaker than said yieldable means so that under the initial impact of said plunger, said support and said lever are moved about the pivotal axis of said support as a unit, and stop means for limiting such pivotal movement of said support without effecting the continued movement of said lever about said shaft.

3. Recording apparatus such as defined in claim 1, including means for yieldingly maintaining the shaft bearing portion of said support in an advanced position and adjustable means for varying the advanced position of such portion.

4. Recording apparatus such as defined in claim 1, in which said yieldable means includes a coiled spring mounted on said shaft and tending to rotate said lever in the direction of the retracted position of said plunger, stop means provided on said support, and a member on said lever engageable with said stop to limit the rotational movement of said lever in the said direction.

5. Recording apparatus such as defined in claim 1, in which said movable support is mounted for pivotal movement about an axis spaced from but parallel to the axis of rotation of said shaft, spring means normally maintaining the shaft bearing portion of said support in an advanced position, said spring means being stronger than said yieldable means so that under the initial impact of said plunger said lever will be rotated, means for limiting the pivotal movement of said lever and thereafter to cause said lever and support to rotate as a unit under the force of said plunger.

6. Recording apparatus such as defined in claim 1, including a rotatable inking pad carried by said support and engageable with the peripheral surface of said marking member, and gears drivingly connecting said inking pad to said shaft.

7. In a recording apparatus adapted to provide markings on a chart, the combination of a pivotally mounted support, yieldable means normally maintaining said support in retracted position, a marking member carried by said support so as to contact the chart in an advanced position of said support, means pivotally mounted on said support, means rotating the marking member upon pivotal movement of the pivotally mounted means relative to the support, yieldable means normally maintaining said pivoted means in a retracted position on said support, means for limiting movement of said pivoted means relative to said support in at least one direction, and means for actuating said pivoted means to an advanced position against the tension of its associated yieldable means, the yieldable means associated with said pivoted means having a different strength than the yieldable means associated with said support, whereby when said actuating means advances said pivoted means, the latter will move relative to said support for a portion of its advancing movement, and said pivoted means and said support will move as a unit for another portion of the advancing movement of said pivoted means.

8. In a recording apparatus adapted to provide markings on a chart, the combination of a pivotally mounted support, yieldable means normally maintaining a free end of said support in retracted position, a marking member carried by such free end of said support so as to contact the chart in an advanced position of such support end, means pivotally mounted on the free end of said support and having a free end projecting outwardly from said support, means associated with the other end of the pivotally mounted means for imparting a rotary movement to the marking means upon pivotal movement of said pivotally mounted means relative to the support, yieldable means normally maintaining said pivoted means in retracted position on said support, means for limiting movement of said pivoted means relative to said support in at least one direction, and actuating means for moving the free end of said pivoted means to an advanced position against the tension of its associated yieldable means, the yieldable means associated with said pivoted means having a different strength than the yieldable means associated with said support, whereby when said actuating means advances said pivoted means, the latter will move relative to said support for a portion of its advancing movement, and said pivoted means and said support will move as a unit for another portion of the advancing movement of said pivoted means.

9. In a recording apparatus adapted to provide markings on a chart, the combination of a rotatable marking member, pivoted means normally supporting said marking member in spaced relation to said chart, means carried by said pivoted means and operable to cause rotation of said marking member, and actuating means cooperable with said operable means to cause the pivoted means to move the marking member into contact with the chart and to cause rotation of said marking member.

10. In a recording apparatus adapted to provide markings on a chart, the combination of a rotatable marking disc having a continuous, peripheral marking surface, pivoted means normally supporting said marking disc in spaced relation to said chart, means carried by said pivoted means and operable to cause rotation of said marking disc, actuating means cooperable with said operable means to cause the pivoted means to move the marking disc into contact with the chart and to cause rotation of said marking disc, and means carried by said pivoted means for rendering said operable means effective to rotate said marking disc during a predetermined portion only of the period in which said actuating means is so cooperating with said operable means.

VOZCAN L. PARSEGIAN.
CHARLES O. FAIRCHILD.
NELSON L. WALKER.

(References on following page)

REFERENCES CITED

The following references are of record in the file of this patent:

UNITED STATES PATENTS

| Number | Name | Date |
|---|---|---|
| 1,188,329 | Schaefer | June 20, 1916 |
| 1,470,691 | Marshall | Oct. 16, 1923 |
| 1,564,634 | Side | Dec. 8, 1925 |
| 1,771,272 | Pudelko | July 22, 1930 |
| 1,816,826 | Cooper et al. | Aug. 4, 1931 |
| 1,927,899 | Mylius et al. | Sept. 26, 1933 |
| 2,074,118 | Ross et al. | Mar. 16, 1937 |
| 2,131,346 | Fairchild | Sept. 27, 1938 |
| 2,217,881 | Allen | Oct. 15, 1940 |
| 2,282,929 | Billstein | May 12, 1942 |
| 2,361,174 | Caldwell | Oct. 24, 1944 |
| 2,421,673 | Young | June 3, 1947 |